United States Patent [19]

Hengesbach

[11] 4,141,477
[45] Feb. 27, 1979

[54] CONTROLLED IRRIGATION DEVICE

[76] Inventor: Robert W. Hengesbach, 7886 Munson Rd., Mentor, Ohio 44060

[21] Appl. No.: 837,735

[22] Filed: Sep. 29, 1977

[51] Int. Cl.² ............................................ B65D 5/72
[52] U.S. Cl. .................................. 222/569; 222/529; 239/542; 285/162
[58] Field of Search ................... 239/376, 379, 542; 251/4, 10, 9; 128/214 C; 222/527, 528, 529, 569, 567, 568; 16/2; 285/162, 196, 338

[56] References Cited

U.S. PATENT DOCUMENTS

| 1,401,584 | 12/1921 | Cizek | 222/569 |
| 2,716,511 | 8/1955 | Leathers | 222/529 |
| 3,390,860 | 7/1968 | Kavanau | 222/529 X |

FOREIGN PATENT DOCUMENTS 321889  2/1929  United Kingdom ...................... 222/569

Primary Examiner—John J. Love
Attorney, Agent, or Firm—John Harrow Leonard

[57] ABSTRACT

A set of fittings for converting a conventional plastic bottle into a drip irrigation device, and the combination of said bottle with certain of the fittings installed thereon. The set includes a hand operable trepanning tool manipulatable from the exterior of the bottle for cutting a substantially circular hole in the side wall of the bottle near its bottom. The fittings include a discharge element and auxiliary attachment elements arranged and related to each other and to the size of the hole so that the discharge element can be installed on the bottle and secured to the bottle wall portion surrounding and adjacent the hole in sealed relation thereto. A flexible tube is connected to the discharge element for conducting liquid from the bottle to points of application. A flow regulator is provided on the tube for regulating the rate of discharge, and is capable of limiting the discharge to a number of preselected controlled drips, selectively.

7 Claims, 6 Drawing Figures

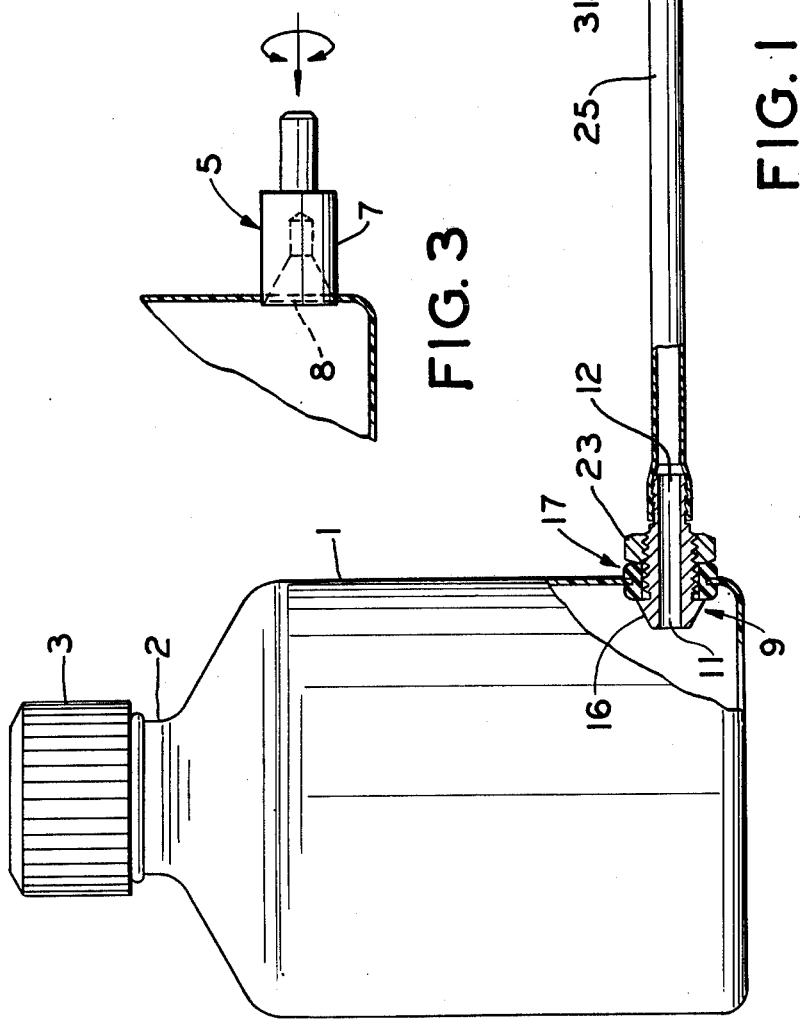
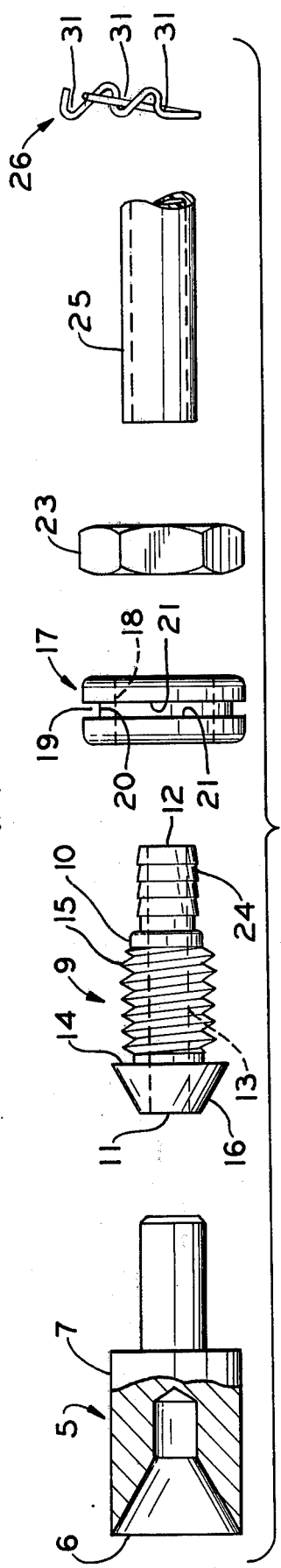

CONTROLLED IRRIGATION DEVICE

BACKGROUND OF INVENTION (1) Field of Invention

Portable drip irrigation device.

(2) Description of Prior Art

Heretofore portable irrigation devices have been provided. Generally these are fabricated at a factory as a specialized unit, completely assembled, and suitable only for its specific purpose of watering a plant. These devices generally include plastic containers predesigned and molded to specifications applicable to that specific purpose.

The present invention, however, is directed to a set of fittings and a cutting tool so arranged and related that they can be used to convert conventional plastic bottles and jars, which are usually thrown away, into drip irrigation devices which can be disposed at selected sites about the premises, one for each plant or small group of plants.

The set and resulting combination with the conventional throw-away containers is particularly desirable, considering the very large number of plastic containers in which products are sold today and which containers are thrown away after a single use, creating vast amounts of waste.

The present set of fittings and tool are devised so that even a small mouth bottle, as to which the access to the interior by the hand of an operator is precluded, can readily be converted to a drip irrigation device by operations and installation of the fittings entirely by manipulation from the outside of the container.

Various other objects and advantages will become apparent from the following description in which reference is made to the drawing.

BRIEF DESCRIPTION OF THE DRAWING

FIG. 1 is a side elevation, partly in section, showing a small necked plastic bottle with the fittings of the present set installed thereon and converting the bottle to a drip irrigation device;

FIG. 2 is a side elevation of the cutter and set of fittings of the present invention;

FIG. 3 is a fragmentary side elevation illustrating the manner of cutting the hole in the side of the plastic bottle;

FIG. 4 is an elevational view of a drip regulating clip comprising an element of the set, and showing it installed on a flexible tube in unrestricting condition;

FIG. 4A is the same view as FIG. 4 except that the clip is in a flow regulating position; and FIG. 5 is a right end elevation of the clip and tube in the flow restricting condition illustrated in FIG. 4A.

Referring first to FIG. 1, the irrigation device resulting from the combination of the fittings of the set with a bottle is illustrated. As there illustrated, the bottle is one of the usual thin walled plastic bottles which is commonly used in vending various detergents, soft drinks, and other liquid products. For emphasizing the advantages of the invention, the plastic bottle is shown as one having a small neck 2, closed by the usual cap 3, so that access to the interior of the bottle through the neck by the hand of an operator is precluded. The set of the present invention is arranged so that the fittings can be installed on the bottle by a householder by operations performed by hand entirely outside of the bottle.

The fittings are shown installed in FIG. 1, and the individual elements constituting the fittings, and the cutting tool, comprising the supplied set, are illustrated in FIG. 2. The set includes all elements necessary for making the combination which converts the bottle 1 into a drip irrigation device.

As illustrated in FIGS. 1 and 2, the set includes a trepanning tool 5 having at one end a circular cutting edge 6 and at the other end a shank portion 7. The tool is so arranged that by grasping it between the fingers of an operator's hand, as illustrated in FIG. 3, pressing it against the wall of the bottle 1 adjacent the bottom thereof while rotating it slightly back and forth about the longitudinal axis of the cutting edge 6, a circular disc is cut from the wall of the bottle, forming a hole 8 therein.

The fittings of the set include a discharge element, indicated generally at 9, which comprises an elongated body 10 having at one end an inlet 11 and at the other end an outlet 12, with a duct 13 connecting the inlet and outlet. Between its outlet and inlet ends, the body 10 is provided with a radial flange 14. Between the outlet end 12 and the flange 14, a portion 15 of the body 10 is externally threaded. Preferably from the inlet end to the flange, the body is tapered outwardly, providing a frustoconical entry portion, as indicated at 16, to facilitate the insertion of the entry portion, up to and including the flange 14, into the inside of the body.

In addition to the discharge element 9, the fittings include a resilient grommet 17, of suitable elastomeric material, having a central passage 18 extending from one end to the other thereof and having a peripheral groove 19 with a bottom wall 20 and axially spaced radial side walls 21. A suitable jam nut 23 is arranged for threaded engagement with the threads of the portion 15.

The central passage 18 of the grommet is such as to snugly receive the portion of the body 10 adjacent the flange 14 so that the body 10 can be inserted, readily, outlet end foremost, through the grommet. The flange 14 is of greater diameter than the passage 18 of the grommet so that it can be disposed against the inner end of the grommet over a substantial wall area thereof. The flange 14 preferably is of about the same diameter, or perhaps slightly larger diameter, than the hole, so that it can be pushed therethrough, even though it requires elastic deformation of the side wall of the bottle adjacent the hole 8.

The grommet is such that one of the radial walls 21 of its groove 19 can be distorted and pushed through the hole 8 in the bottle and allowed to self-restore and thus dispose the wall portion of the bottle defining and surrounding the hole 8 into the groove 19, with the defining edge of the hole 8 disposed at, or closely adjacent to, the bottom of the groove 19. Preferably the flange 14 extends radially outwardly slightly beyond the bottom wall 20 of the groove 19 or the defining edge of the hole 8. These diameters are so arranged that, after grommet 17 and the flange 14 of the discharge element have been pushed through the hole 8 to the positions illustrated in FIG. 1, the nut 23 is applied to the threaded portion 15 of the body 10 and drawn tightly to compress the grommet between the flange 14 and the nut 23 sufficiently to distort the grommet so that it effects a sealed relation between the defining edge of the hole 8, and the bottom 20 of the groove 19, or between the wall of the bottle adjacent the hole 8 and the side walls 21 of the groove 19, or a sealed relation between the flange 14 and the inner end of the grommet 17, or a combination of any two or more of those alternatives.

The body 10 at its outlet end, has a reduced diameter portion 24 on which is received the end of a resilient elastomeric tube 25 which provides one of the elements of the set of fittings. The tube 25 is held frictionally, or by cement, onto the portion 24 of the body.

Mounted on the tube 25 is a suitable adjustable pinch clamp 26 which can be clamped onto the tube to different degrees to regulate the flow of liquid from the interior of the bottle to the tube outlet. The clamp 26 is such that the flow can be reduced to a small controlled drip, the amount depending upon the size of the container, the amount of water to be supplied to the particular plant, and the duration of the period of application.

One type of clip 26 which may be used in the set is illustrated in FIGS. 4, 4A, and 5. As there illustrated, the clip 26 may be a piece of spring wire bent between its ends, as indicated at 27 to provide legs 28 and 29 between which the tube 26 passes. The outer end of the leg 29 is bent toward the leg 28 to provide a latch portion 30. The portion 30 is bent between its ends to provide a row of detents 31 which are concave in a direction away from the leg 28, and behind which the outer end of the leg 28 can be disposed merely by moving the leg 28 toward the leg 29 a distance to pinch the tube 25, and thereby restrict the flow therethrough to the desired degree, and then laterally. Due to the spring force of the wire, the outer end of the leg 28 is held behind the selected detent 31 of the portion 30.

By vending the set of elements and tool as a kit, an ecological advantage is obtained in that throw-away plastic bottles and other such containers can readily be converted by the purchaser of the kit to a controlled irrigation device, and the waste of plastic necessary for specially molded irrigation devices is eliminated.

Having thus described my invention, I claim:

1. In combination a receptacle of set synthetic plastic having a thin peripheral wall with a hole therethrough, said peripheral wall being sufficiently rigid to be self-supporting, but resilient enough so that the wall of the hole can be elastically deformed;

a resilient grommet having a central passage and having an external peripheral groove coaxial with the passage and opening outwardly radially so that the groove has a bottom wall and spaced radially extending side walls;

a discharge element having a body with an inlet at one end and an outlet at the other end, and having a passage connecting the inlet and outlet;

an external radial flange on the body between its ends and having one face facing toward the outlet end of the body;

an external screw thread on the body between the flange and the outlet end;

said grommet being disposed in said hole with the marginal portion of the peripheral wall, which surrounds and is adjacent to, the hole, disposed between said radial side walls of the groove;

said flange and hole being so related in diameter that the flange can be pushed, inlet end foremost, bodily endwise through the hole from the outside of the receptacle;

the diameter of the flange being greater than the diameter of said central passage of the grommet and said one face of the flange engaging the inner end of the grommet;

the threaded portion of the body being so related to the diameter of said central passage of the grommet that said portion can pass therethrough, and protrude from the other end of the grommet; and a jam nut in threaded engagement with that threaded portion of the body at the exterior of the receptacle, said nut being in stressed engagement with the outer end of the grommet and cooperating with the flange to compress the grommet endwise so as to clamp the side walls of its groove into sealing relation with said adjacent marginal portion of the peripheral wall of the receptacle, and the flange into sealing relation with the inner end of the grommet; whereby the fitting can be installed entirely by manipulation from the outside of the receptacle.

2. The combination according to claim 1 wherein the grommet is so compressed by the flange and nut that the bottom wall of its groove is deformed into sealing relation to the peripheral edge wall of the hole.

3. The combination according to claim 1 wherein the diameter of said one face of the flange is about the same diameter as the outer diameter of the bottom wall of the groove of the grommet.

4. The combination according to claim 1 wherein the diameter of the flange is greater than the normal diameter of the hole, and the resilience of the receptacle wall is such that the flange can elastically deform the hole and be entered therethrough into the body by forces applied endwise of the body.

5. The combination according to claim 1 wherein the diameter of the hole is related to the diameter of the bottom wall of the groove of the grommet so that the peripheral edge wall of the hole engages the bottom wall of the groove when the grommet is uncompressed by the flange and nut, and is stressed into sealing engagement with said edge of the hole when the grommet is compressed between the nut and flange.

6. The combination according to claim 1 wherein the discharge element body has an entry portion between its inlet end and the flange, and said entry portion is tapered in a direction away from the flange toward the inlet and of the body.

7. The combination according to claim 1 wherein the hole and flange are circular and the diameter of the flange is substantially the same as the diameter of the hole, and said one face of the flange is planar and circumferentially continuous and uninterrupted throughout its extent.

* * * * *